Dec. 17, 1935.　　　　D. B. PERRY　　　　2,024,473
FLEXIBLE COUPLING
Filed May 18, 1934　　　　4 Sheets-Sheet 1

INVENTOR.
David Barnes Perry
BY
Synnestvedt + Lechner
ATTORNEYS.

Dec. 17, 1935.　　　D. B. PERRY　　　2,024,473
FLEXIBLE COUPLING
Filed May 18, 1934　　　4 Sheets-Sheet 3
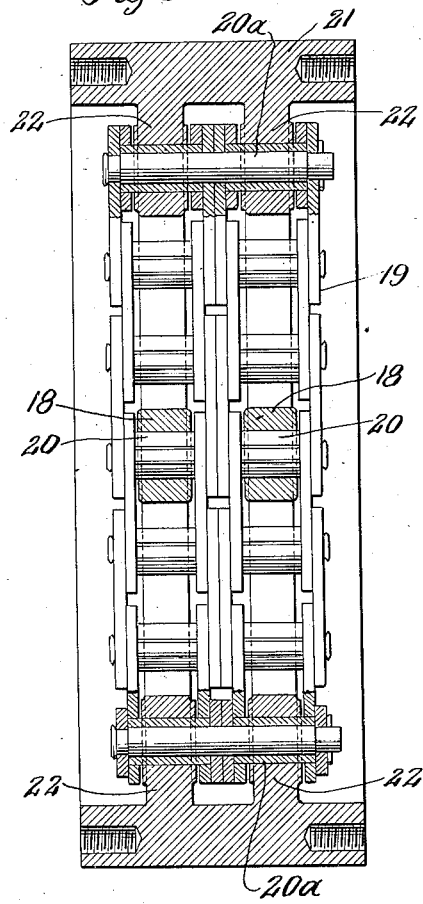
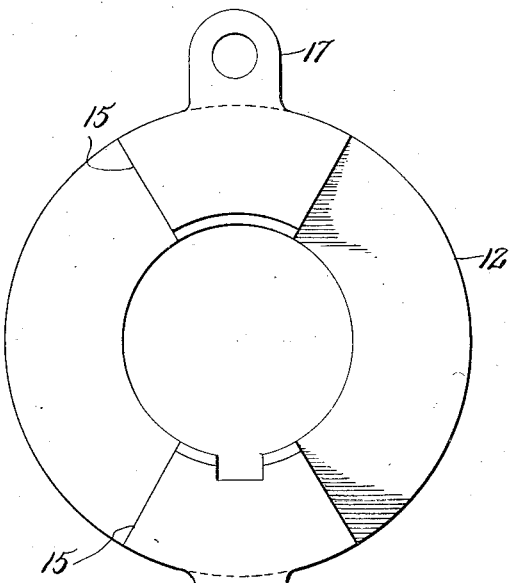
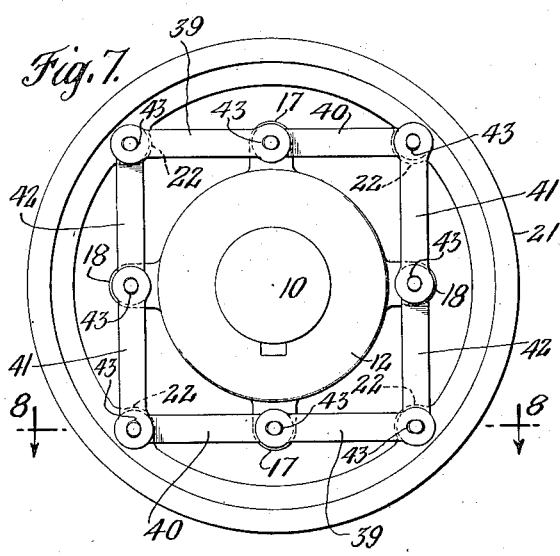
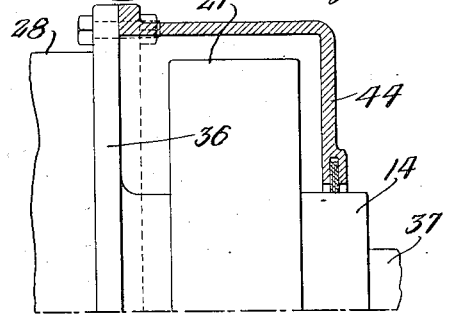
INVENTOR.
David Barnes Perry
BY
Symmestvedt & Lechner
ATTORNEYS.

Dec. 17, 1935.  D. B. PERRY  2,024,473

FLEXIBLE COUPLING

Filed May 18, 1934  4 Sheets-Sheet 4

INVENTOR.
David Barnes Perry
BY
Symmestvedt & Lechner
ATTORNEYS.

Patented Dec. 17, 1935

2,024,473

UNITED STATES PATENT OFFICE 2,024,473

FLEXIBLE COUPLING

David Barnes Perry, Ithaca, N. Y., assignor to Morse Chain Company, Ithaca, N. Y., a corporation of New York Application May 18, 1934, Serial No. 726,283

13 Claims. (Cl. 64—19)

This invention relates to flexible couplings for drivingly connecting rotating members.

One of the primary objects of my invention is the provision of a coupling adapted to take care of parallel or angular misalinement of rotary members to be coupled together in which there is a minimum amount of back lash.

Another object resides in the provision of a coupling of the above character in which a novel arrangement of connecting linkage is employed.

A more specific object resides in the provision of a coupling of the above character in which flexible connecting means in the form of a drive chain is employed in a novel arrangement.

A further object is to provide a simple, strong, and effective coupling for drivingly connecting rotating members having the flexibility necessary to permit of a certain amount of parallel and angular misalinement but having no appreciable back lash.

I also aim to combine such flexible couplings with clutches of a particular type to secure certain advantages hereinafter appearing.

How the foregoing together with such other objects and advantages as may hereinafter appear or are incident to my invention are realized is illustrated in preferred form in the accompanying drawings wherein—

Fig. 3 is a cross section taken substantially on the line 3—3 of Fig. 1.

Fig 4 is a face view of the right hand coupling member of Fig. 2 and looking toward the right as indicated by the line 4—4 in that figure.

Fig. 7 is a face view of a modification of my invention.

Fig. 8 is a plan section taken on the line 8—8 of Fig. 7; and

Fig. 9 illustrates another modification of the invention.

Figure 1:
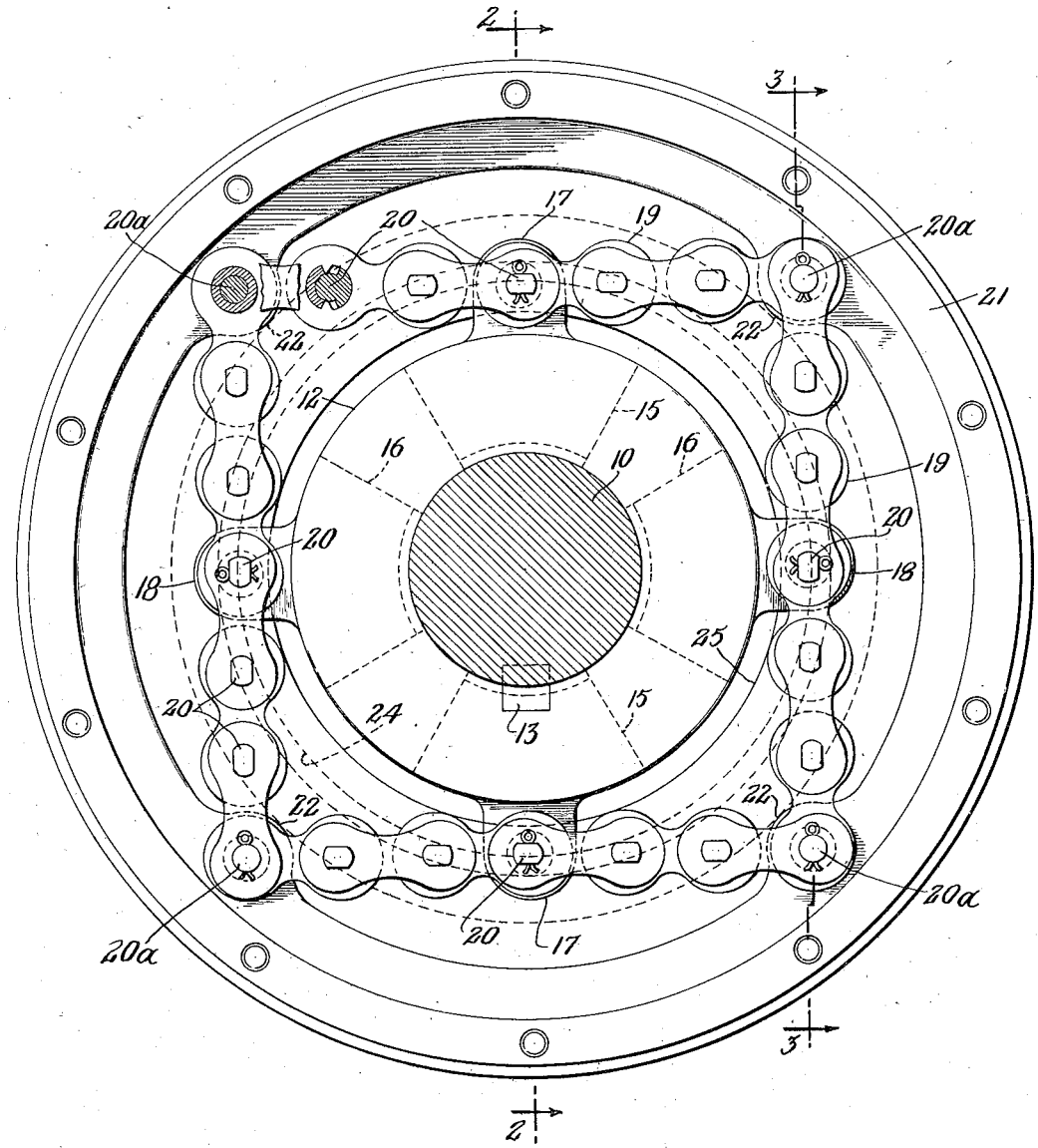
Fig. 1 is a face view of a coupling constructed in accordance with my invention with an end member of the coupling removed.
Figure 2:
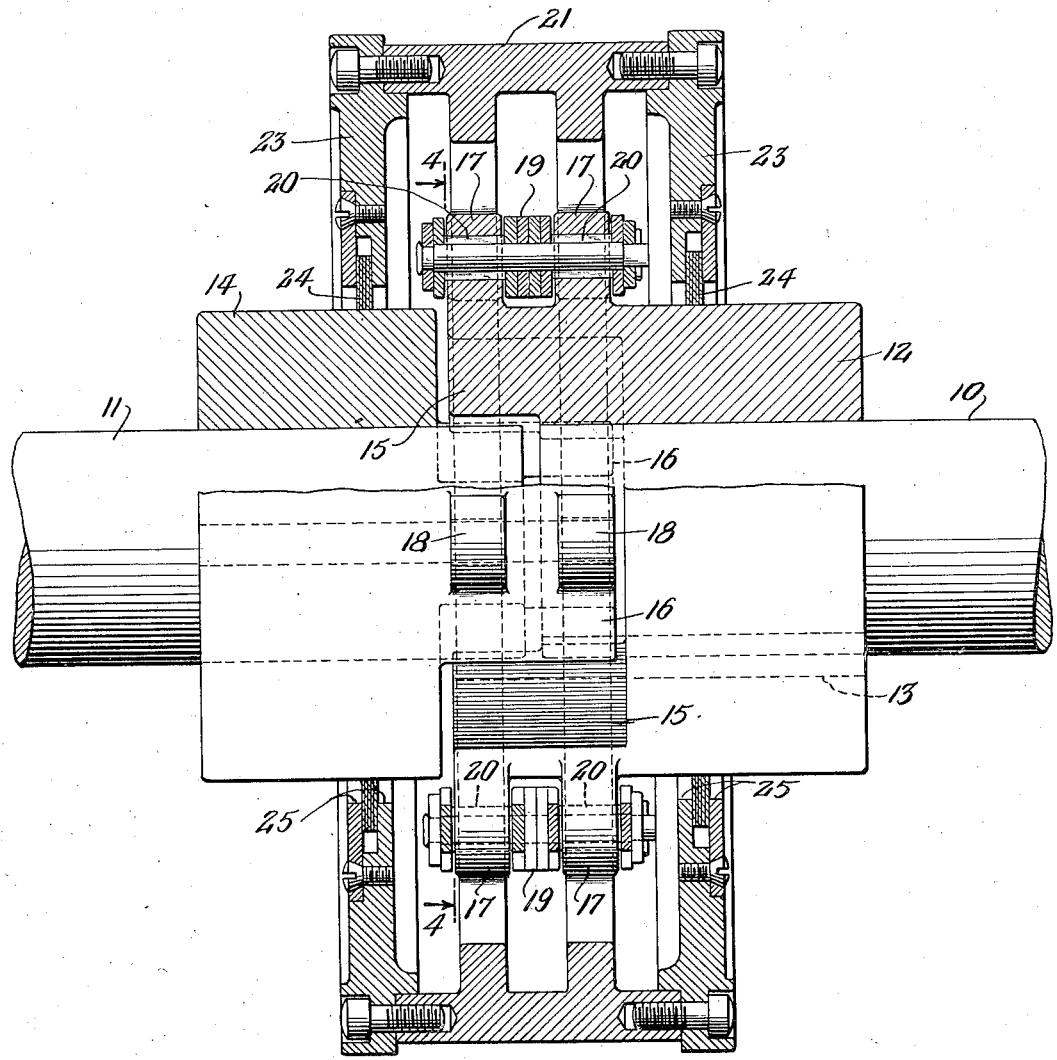
Fig. 2 is a cross section taken substantially on the line 2—2 of Fig. 1 but with the lower portion of the coupled members appearing in elevation.

Referring more particularly to Figs. 1 to 4 inclusive, I have shown my invention employed as a coupling between the ends of two shafts 10 and 11, one of which is the driving shaft of a driving device, and the other the driven shaft of a device to be driven by the driving device.

The shaft 10 carries a coupling member 12, in this instance secured thereon by means of a key 13, and the shaft 11 carries a similar coupling member 14. The coupling member 12 is provided with a pair of jaws 15 spaced 180° apart, and the coupling member 14 has similar jaws 16, the size of the jaws relative to the spaces therebetween being such that the jaws of one member fit the spaces between the jaws of the other with sufficient clearance so that there is no possibility under normal operation for the jaws of one member to engage those of the other member.

The jaws 15 of the coupling member 12 are provided with lugs 17 and the jaws 16 of the coupling member 14 are provided with similar lugs 18, the lugs being spaced apart longitudinally of the coupling so as to accommodate a double strand roller drive chain 19 of a well known type. As will be seen from inspection of Figs. 2 and 3, these lugs are provided with apertures adapted to receive the pintles 20 of the chain, one of which is shown in cross section in the upper stretch of chain in Fig. 1. If desired, the apertures may be made large enough to receive the rollers which usually surround the pintles of chains of the type illustrated.

A ring member 21 is located between the coupling members 12 and 14 in spaced surrounding relation thereto and is provided with four sets of internal lugs 22 equally spaced circumferentially of the member and adapted to receive the chain in a manner similar to the lugs 17 and 18.

In assembling the coupling, the coupling members 12 and 14 are positioned so that the jaws and lugs of one member are at right angles to those of the other member and the ring member is positioned to encircle these members with its lugs 22 half way between the lugs of the coupling members. Crosswise of the coupling, all of the lugs lie in the same plane, as will be seen from Figs. 2 and 3.

The chain is secured to the lugs of the ring member 21 and of the coupling members in a manner to take the form of a rectangle, as viewed in Fig. 1, it being noted that the pintles 20a at the lugs of the ring member are of the plain round pin type in order to permit of the right angle bending of the chain. Although the remaining pintles in the particular chain illustrated are of a construction which only permits of a bend less than a right angle, all of the pintles may be of the round pin type, if desired.

It will thus be seen that the chain is divided into four strands each of which is stretched from one set of lugs to the adjacent set of lugs of the ring member and to the central portion of which the lugs of the coupling members are attached. Since the lugs 17 are oppositely disposed and lie half way between the lugs 18 circumferentially considered, they are attached to the central portions of two opposite strands of chain while the lugs 18 are attached to the central portions of the other two strands of chain. Thus the driving shaft 10 is flexibly connected to the driven shaft 11 by means of the chain connection from one coupling member to the ring member and from the ring member to the other coupling member.

While I have shown four sets of lugs on the ring member 21 and two sets on each of the coupling members, it is to be understood that the number of lugs on each may be increased so long as the relation thereof above described is maintained. When employing more lugs, the flexible element will of course be divided into a corresponding greater number of strands.

With my improved arrangement, parallel or angular misalignment of the rotating members to be coupled is taken care of with a minimum amount of or no appreciable back lash in the coupling, it being pointed out that in a coupling of say 11 inches in outside diameter, in which the length of each strand of the chain would be approximately six inches, a displacement of one of the shafts or rotating members out of line with the other of say ¼ of an inch, requires a slack in the chain of only approximately .011 of an inch, which amount would hardly be felt in back lash between the two shafts. In other words, the amount of elongation or lengthening of the chain necessary to take care of such misalignment would be approximately .011 of an inch.

Calculations have shown that with a displacement of ¼ of an inch the necessary clearance in the connecting links allows a circumferential movement of 1° 18′, and that when the shafts are displaced ⅛ of an inch there is a circumferential movement of only 20′. These calculations are based on the points of attachment being three inches apart in a rectangular arrangement of the chain six inches from corner to corner. It will thus be seen that while there is practically no back lash in the coupling, it still takes care of a reasonable degree of angular or parallel misalignment of the rotating members being coupled.

I have provided the ring member 21 with end plates or shields 23 carrying yielding rings 24 which engage the rotating members 12 and 14 whereby an oil tight casing is provided for the coupling. The openings 25 in the plates are of a diameter to provide suitable clearance to take care of misalinement of the coupling parts.

While I have shown a double strand chain as the flexible connecting element of the coupling, it is to be understood that I also contemplate employing chains having a single strand or any multiple of strands in width as may be desirable for the loads to be transmitted.

Figure 5:
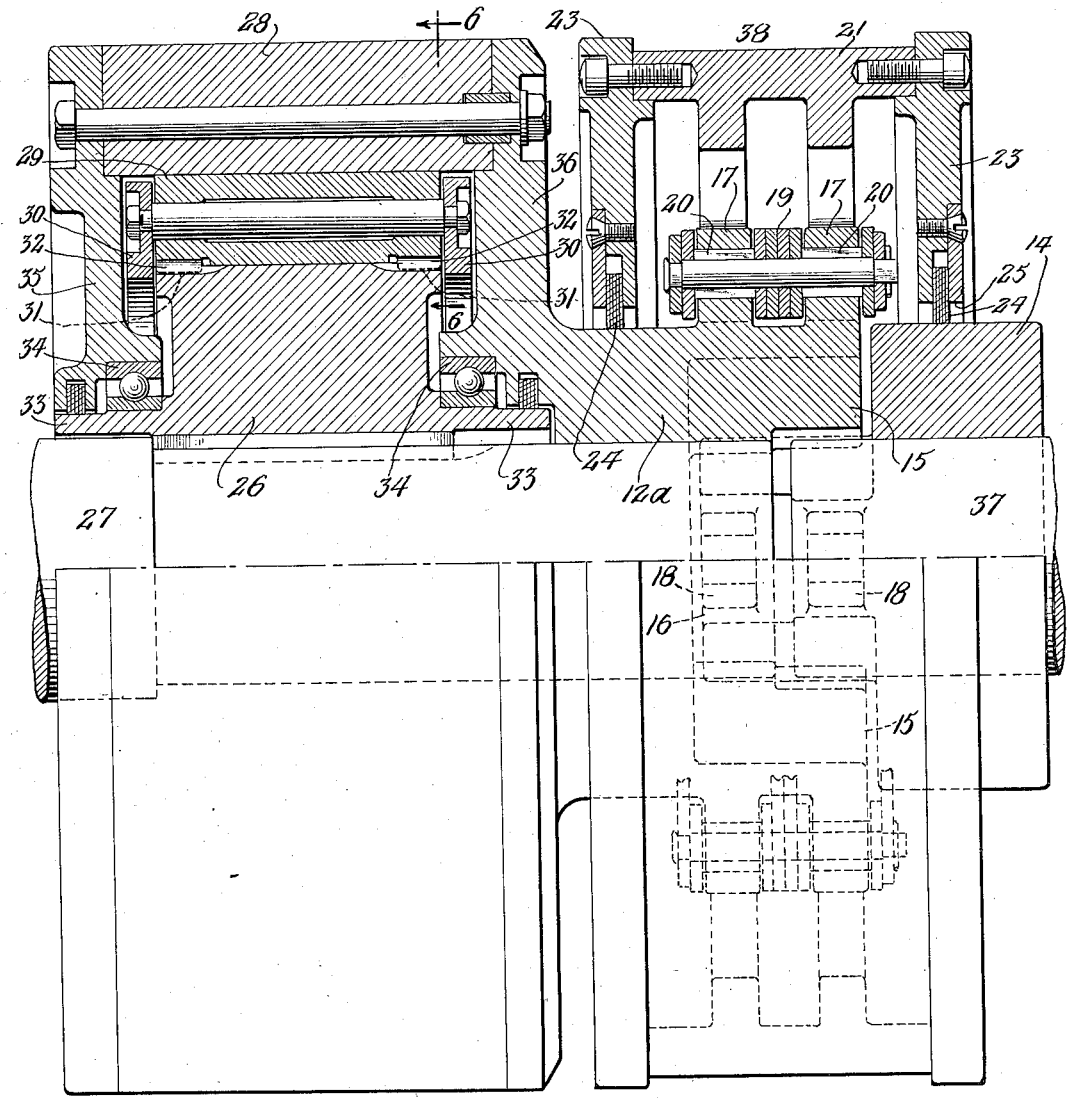
Fig. 5 is a one-half cross section and one-half side elevation showing my improved coupling associated with a clutch of a type hereinafter appearing.

In Fig. 5, I have illustrated my improved coupling used in association with a clutch of a type in which it is extremely desirable to employ a coupling having the advantages with respect to back lash which are present in my coupling. The particular clutch illustrated comprises in general a driving member 26 secured on the driving shaft 27, a driven member 28 encircling or in spaced surrounding relation to the driving member 26 and a plurality of cams or eccentric pawls 29 located in the annular space between the driving and driven members. The cams 29 are rotatably mounted in a pair of floating rings 30 and are provided with gear teeth 31 adapted to mesh with corresponding gear teeth 32 provided on the driving member 26.

The driving member 26 is provided with hub portions 33 on which the driven member 28 is mounted through the medium of bearings 34 in the end plates 35 and 36 which are secured to the member 28 so that the driving and driven members are maintained in concentric relation.

Figure 6:
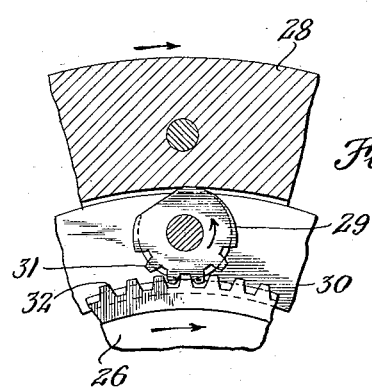
Fig. 6 is a fragmentary section taken on the line 6—6 of Fig. 5 illustrating a detail of the clutch.

When there is load on the driven member, a slight rotation of the driving member in the direction of the arrow in Fig. 6 rotates the cams 29 in the opposite direction and causes the eccentric cam surfaces thereof to bear with a wedging action against the inner periphery of the driven member so that the driving and driven members are clutched together for drive and the drive is transmitted to the shaft 37 of a device to be driven through the medium of the flexible coupling 38. When the rotation of the driving member is reversed the cams are quickly thrown out of engagement with the driven member and the clutch becomes disengaged. Such disengagement also takes place as in free wheeling when the speed of the driven member overruns the speed of the driving member. I do not claim the particular clutch shown, as this is the invention of Fred C. Thompson and is described and illustrated in his copending application Serial No. 724,466 filed May 8, 1934.

The coupling is of the same construction as that illustrated in Figs. 1 to 4 inclusive with the exception of the rotating member 12a which in this instance is shown integral with the end plate 36 of the driven member 28 of the clutch and therefore I have indicated like parts with like reference numerals.

Since the driving and driven members of the particular clutch illustrated are mounted to be maintained in concentric relation both when the clutch is engaged and disengaged, provision must be made to take care of any misalignment as between the clutch and the driven shaft 37 and this is taken care of by the flexible coupling 38. However, due to the nature of the clutch, it is important that the coupling have no appreciable back lash otherwise advantages gained through the quick response of the clutch to relative rotative movement of the driving and driven members would be lost by reason of coupling back lash. Since my improved coupling practically eliminates back lash, it is especially advantageous for use with clutches having the above characteristics.

In clutches of the above type, in which the driving and driven members are not mounted, as by means of the bearings 34, to be positively maintained in concentric relation the clutch cams function as a self-centering device, and unless provision is made to permit of this in associating driving and driven devices with the clutch, proper functioning of the clutch would not be obtained.

I therefore employ the flexible coupling between one of the rotating members of the clutch and the device to be drivingly connected thereto, in this instance between the driven member 28 of the clutch and the shaft 37 of a device to be driven, which takes care of any misalinement of the connected members and enables the cams to act in their normal manner, i. e., with self-centering action. It will be seen that by providing such a flexible connection, there is no tendency for the cams to be thrown out of line with one end thereof taking all of the load due to misalignment.

In Figs. 7 and 8, I have illustrated a modification in which the flexible element for connecting the coupling members to the ring member comprises a plurality of simple links arranged in the form of a rectangle, as viewed in Fig. 7, and connected to the lugs of the coupling and ring members by means of pins. As illustrated in Fig. 8, each link is composed of two plates, although any number of plates may be employed to make up the links.

The links 39 and 40 are connected at one end to the lugs 17 of one coupling member and at their other ends to the adjacent lugs 22 of the ring member and the links 41 and 42 are connected at one end to the lugs 18 of the other coupling member and at their other ends to the adjacent lugs 22 of the ring member.

In order to provide for the elongation of the linkage necessary to take care of misalinement of the coupling members, I have provided pin apertures in the links which are elongated in the direction of the length of the links, the amount of elongation as shown in the drawings being exaggerated since in actual practice in a coupling having links measuring three inches from aperture to aperture, a clearance of .003 of an inch in both apertures of each link is sufficient to take care of approximately ¼ of an inch misalinement of the coupling members. It is pointed out that clearance is provided at both sides of the pins so that the load is transmitted through the links by tension at all times and not by compression. In this connection, it is pointed out that if no clearance were provided at 43, the load would be transmitted by compression by means of the links adjacent the tension links as soon as wear of the apertures in the tension links took place.

In Fig. 9, I have illustrated a modification in which the coupling is enclosed in a casing 44 which may be carried by one of the rotating members of the coupling, or by an adjacent rotating member of an associated device such as the member 36 of a clutch.

It will be seen from the foregoing that I have provided an improved flexible coupling which among other things is especially adapted for use where the elimination of back lash in the coupling is of importance, and while I have selected a particular form of clutch as exemplifying a novel combination of clutch and flexible coupling, I do not wish to be limited to such use, as the advantages to be realized through the practice of my invention may be obtained in many other uses.

I claim:

1. A flexible coupling for rotating members comprising a member in surrounding relation to said members, linkage connected to said surrounding member at equally spaced circumferential points, and to each of the rotating members at diametrically opposite points, the points of connection of the linkage to the rotating members being midway between the points of connection of the linkage to the surrounding member.

2. A flexible coupling for rotating members comprising a member in surrounding relation to said members, linkage connected to said surrounding member at four equally spaced circumferential points, and to each of the rotating members at two diametrically opposite points, the points of connection of the linkage to the rotating members being midway between the points of connection of the linkage to the surrounding member.

3. A flexible coupling comprising a pair of adjacent rotating members each having a plurality of external lugs, a member encircling said rotating members and having a plurality of internal lugs, the lugs of said rotating member lying in alternate equally spaced relation circumferentially of the members and midway between the lugs of the encircling member circumferentially considered, and linkage means attached to said lugs for connecting the members for drive.

4. A flexible coupling comprising a pair of adjacent rotating members, a member in spaced surrounding relation to said rotating members, and means flexibly connecting said members comprising an endless chain located in the circumferential space between the members secured to the surrounding member at a plurality of equally spaced circumferential points and secured alternately to the rotating members at circumferential points lying midway between the first mentioned points.

5. A flexible coupling comprising a pair of adjacent rotating members, a member in spaced surrounding relation to said rotating members, an endless chain in the circumferential space between said members, means for attaching said chain to the surrounding member at four equally spaced points with the chain divided into four strands in the form of a square, means for attaching two opposite strands to one of the rotating members, and means for attaching the remaining two strands to the other rotating member.

6. A flexible coupling comprising a pair of adjacent rotating members, a member in spaced surrounding relation to said rotating members, an endless chain in the circumferential space between said members, means for attaching said chain to the surrounding member at equally spaced points with the chain divided into a plurality of strands in the form of a polygon, means for attaching alternate opposite strands to one of the rotating members, and means for attaching the remaining strands to the other rotating member.

7. In a flexible coupling, a pair of rotating members each having a plurality of external circumferentially spaced lugs, ring means in spaced surrounding relation to said rotating members and having a plurality of internal circumferentially spaced lugs, the rotating members being so relatively positioned that successive lugs are on opposite members and the lugs on the ring means being located midway between the successive lugs of the rotating members, and means flexibly connecting said members comprising links attached to said lugs.

8. A flexible coupling comprising a pair of rotating members to be coupled together for drive, a ring in spaced surrounding relation to said members, linkage in the circumferential space between said members and ring constituting a flexible connection therebetween, means located in the same transverse plane for attaching said linkage to said members and to said ring at circumferentially spaced points with the connections to the ring alternating with the connections to the coupling members.

9. A flexible coupling comprising a pair of rotating members to be coupled together for drive, a ring in spaced surrounding relation to said members, a chain of the drive chain type in the circumferential space between said members and ring, means for attaching said chain to the ring at a plurality of equally spaced circumferential points with the chain stretched between adjacent points of attachment to form a plurality of straight strands, means for attaching alternate strands to one of the rotating members and the remaining strands to the other rotating member at points midway of the strands.

10. A flexible coupling comprising a pair of rotating members to be coupled together for drive, ring means in spaced surrounding relation to said members, and linkage in the circumferential space between said members and ring means and pivotally connected thereto, said linkage forming a flexible connection between the rotating members and ring means yielding to parallel and angular misalignment of the rotating members but substantially non-yielding to relative rotative movement of said members, the points of connection between the ring means and the linkage and between the pair of rotating members and the linkage being spaced apart circumferentially of the coupling.

11. A flexible coupling comprising a pair of rotating members to be coupled together for drive, a ring in spaced surrounding relation to said members, linkage in the circumferential space between said members and ring forming a flexible connection therebetween, pin means for attaching the linkage to the ring member at equally spaced circumferential points and to the rotating members at points midway between the points of attachment to the ring member, said linkage having apertures providing clearance connection with the pins.

12. A flexible coupling for rotating members comprising a ring member in spaced surrounding relation to said rotating members, and an endless chain of the drive chain type connected to said ring member at equally spaced circumferential points, and to each of the rotating members at diametrically opposite points, the points of connection of the chain to the rotating members being midway between the points of connection of the chain to the ring member.

13. A flexible coupling comprising a driving member, a driven member, ring means in surrounding relation to the driving and driven members, and means connecting said ring means to said driving and driven members comprising an endless strand of links and means pivotally connecting said strand of links to the driving member, to the ring means and to the driven member, at successive spaced points circumferentially of the coupling in the order named.

DAVID B. PERRY.